United States Patent
Harkcom et al.

(10) Patent No.: US 9,648,803 B2
(45) Date of Patent: May 16, 2017

(54) BI-FOLD HOODS FOR AGRICULTURAL EQUIPMENT

(75) Inventors: Melanie W. Harkcom, New Holland, PA (US); Todd A. Becker, Blandon, PA (US)

(73) Assignee: CNH Industrial America LLC, New Holland, PA (US)

(*) Notice: Subject to any disclaimer, the term of this patent is extended or adjusted under 35 U.S.C. 154(b) by 398 days.

(21) Appl. No.: 13/568,812

(22) Filed: Aug. 7, 2012

(65) Prior Publication Data

US 2014/0041355 A1    Feb. 13, 2014

(51) Int. Cl.
A01D 67/00 (2006.01)
A01D 34/00 (2006.01)
A01D 75/20 (2006.01)

(52) U.S. Cl.
CPC ........... *A01D 34/001* (2013.01); *A01D 75/20* (2013.01)

(58) Field of Classification Search
CPC .... A01D 2101/00; A01D 34/63; A01D 34/81; A01D 34/828; A01D 34/00; A01D 34/64; A01D 34/66; A01D 75/20; A01D 75/206; A01D 34/001
USPC ................................................. 56/320.1, 218
See application file for complete search history.

(56) References Cited

U.S. PATENT DOCUMENTS

| | | | |
|---|---|---|---|
| 2,041,522 A | 5/1936 | Breer | |
| 2,144,982 A | 1/1939 | Jones | |
| 3,907,147 A | 9/1975 | Goobeck | |
| 3,971,198 A * | 7/1976 | Lane | 56/202 |
| 4,095,398 A * | 6/1978 | Aumann et al. | 56/202 |
| 4,131,172 A | 12/1978 | Wolfgram | |
| 4,282,704 A | 8/1981 | Stevens | |
| 4,377,063 A * | 3/1983 | Leaphart | 56/202 |
| 4,415,052 A | 11/1983 | Gauer | |
| 4,545,719 A | 10/1985 | Busboom | |
| 4,566,257 A * | 1/1986 | Akrabawi | 56/202 |
| 4,907,403 A * | 3/1990 | Jones | 56/202 |
| 4,989,400 A * | 2/1991 | Wark | 56/202 |
| 5,042,241 A * | 8/1991 | Boylston et al. | 56/202 |
| 5,195,311 A | 3/1993 | Holland | |
| 5,279,100 A | 1/1994 | Pruitt et al. | |
| 5,564,265 A * | 10/1996 | Pitt | 56/202 |
| 5,673,544 A * | 10/1997 | Voigt | 56/202 |
| 6,151,875 A * | 11/2000 | Collins | 56/202 |
| 6,532,723 B2 * | 3/2003 | Delmas | A01B 73/005 56/14.7 |
| 6,810,651 B1 * | 11/2004 | Washington | 56/202 |
| 6,845,603 B1 | 1/2005 | Stephenson et al. | |

(Continued)

*Primary Examiner* — Robert Pezzuto
*Assistant Examiner* — Joan D Misa
(74) *Attorney, Agent, or Firm* — Patrick M. Sheldrake

(57) ABSTRACT

A foldable top cover for an agricultural mower that includes first and second generally planar cover portions connected by an intermediately positioned hinge that reduces the required overhead clearance necessary for opening the top cover. The hinge connection axis is offset in a first direction from the from plane of the cover portions and further includes hinge stops on the first and section portions that limit the hinge motion so that the first and second portions are maintained in a generally co-planar arrangement when in an operating position but may be folded in a direction opposite to the offset direction of the hinge connection thereby allowing the top cover to be compactly repositioned for service access to the mower.

20 Claims, 4 Drawing Sheets

(56) References Cited

U.S. PATENT DOCUMENTS

| | | |
|---|---|---|
| 7,037,034 B2 | 5/2006 | Dillingham |
| 7,096,987 B2 | 8/2006 | Moen et al. |
| 7,806,593 B2* | 10/2010 | Toporski ........................ 383/33 |
| 7,980,049 B1* | 7/2011 | Branham ............ A01D 34/664 |
| | | 56/320.1 |
| 8,051,635 B2* | 11/2011 | Vineis ............................ 56/202 |
| 2007/0071365 A1* | 3/2007 | Stevens et al. ................ 383/33 |
| 2008/0083204 A1* | 4/2008 | Vineis ............................ 56/202 |

* cited by examiner

BI-FOLD HOODS FOR AGRICULTURAL EQUIPMENT

BACKGROUND OF THE INVENTION

This invention relates generally to agricultural machines and, more particularly, to improved cover lid for machines having limited clearance for movement of the cover lid.

Rotary disc cutterbar commonly used on many agricultural mowers are contained within a housing to shield bystanders from foreign objects that are engaged and propelled by the rotating discs. The housing generally includes a moveable top cover shield that is operably positioned generally horizontally above the cutterbar and a curtain disposed along a forward edge of the top cover and hanging therefrom so as to extend generally vertically across the front of the cutterbar. The top cover and curtain assembly is typically hinged at the top of the housing to allow the top cover and curtain assembly to be raised to facilitate access to the cutterbar for service. The tongue and power take-off drive shaft of many mowers extends over a portion of the housing and is moveable to allow the trailing position of the mower behind a tractor to be altered. Often the top cover and curtain will interfere with movement of the tongue and/or drive shaft when the top cover is raised for access, or more commonly, will be damaged by movement of the tongue.

It would be advantageous to provide an alternate top cover and curtain assembly that reduces the amount of overhead space required for opening of the top cover. This would allow the implement draft tongue to pass over an opened top cover assembly without damaging the top cover assembly. Further advantages would be realized by a top cover that could be installed on current machine designs without requiring modification of the machines.

SUMMARY OF THE INVENTION

Accordingly, the present invention, in any of the embodiments described herein, may provide one or more of the following advantages:

It is an object of the present invention to provide a top cover for a rotary disc mower which allows a draft tongue to be positioned at a relatively low location on the mower frame without concern of damage to the top cover caused by tongue movement.

It is a further object of the present invention to provide a top cover for a housing on a disc cutterbar equipped mower that is easily repositioned to allow access to the cutterbar for service.

It is a further object of the present invention to provide a top cover for a cutterbar housing that incorporates an intermediately positioned foldable hinge that allows the top cover to be folded generally in half.

It is a further object of the present invention to provide a plastic replacement top shield for a rotary disc cutterbar-equipped mower that is capable of supporting the front curtain shield.

It is a still further object of the present invention to provide a replacement top shield for a mower that weighs less that the steel shield it replaces.

It is a still further object of the present invention to provide a bi-folding top cover for the cutterbar housing of an agricultural mower that is durable in construction, inexpensive of manufacture, carefree of maintenance, easily assembled, and simple and effective to use.

These and other objects are achieved in accordance with the instant invention by providing a foldable top cover for an agricultural mower that includes first and second generally planar cover portions connected by an intermediately positioned hinge that reduces the required overhead clearance necessary for opening the top cover. The hinge connection axis is offset in a first direction from the from plane of the cover portions and further includes hinge stops on the first and section portions that limit the hinge motion so that the first and second portions are maintained in a generally co-planar arrangement when in an operating position but may be folded in a direction opposite to the offset direction of the hinge connection thereby allowing the top cover to be compactly repositioned for service access to the mower.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
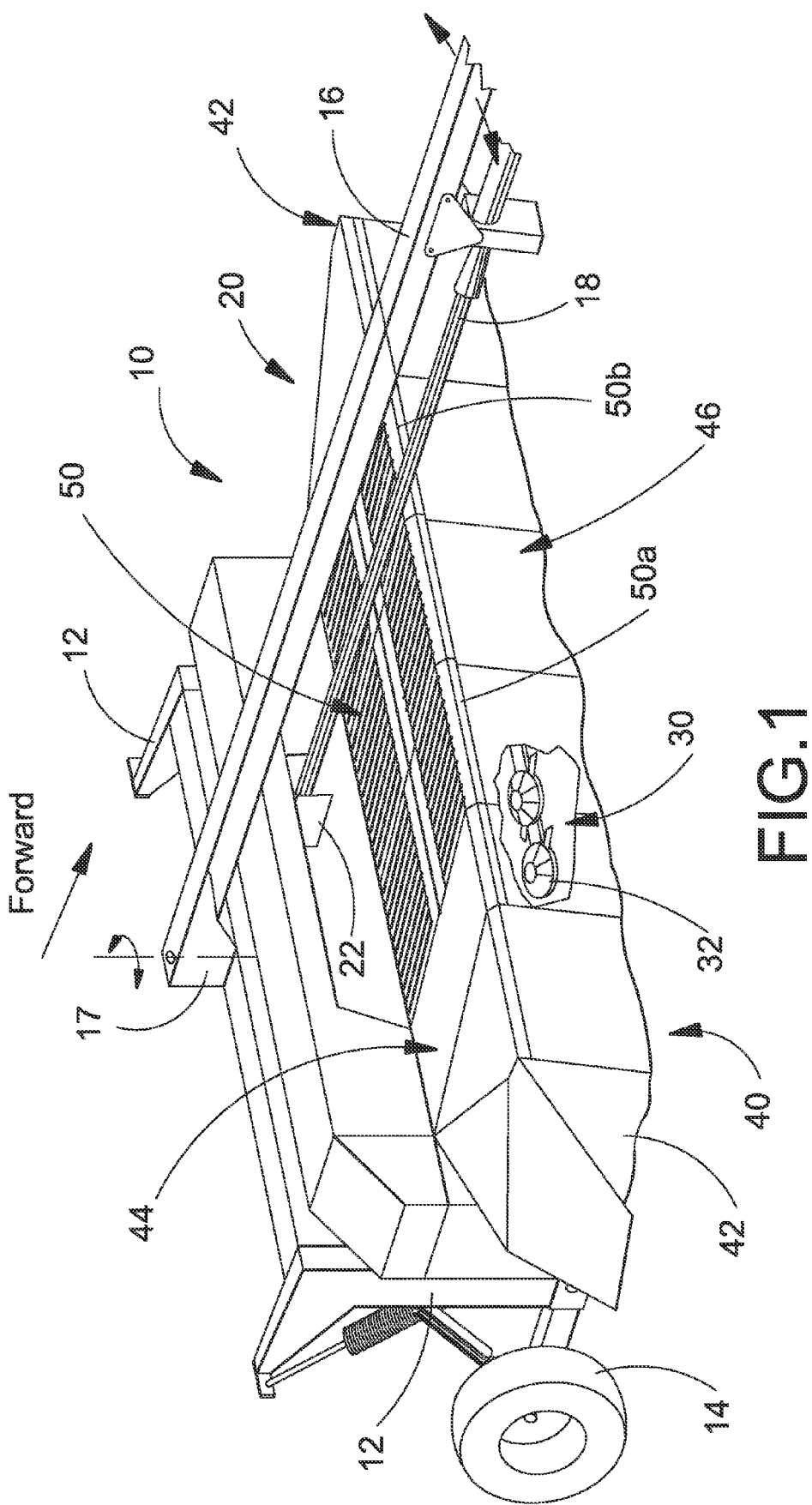
FIG. 1 is a partial perspective view of an agricultural mower of the type on which the present invention is useful.

Referring now to the drawings and particularly to FIG. 1, an agricultural mower 10 featuring a frame 12 supported on the ground by one or more wheels 14 and connected to a tractor or the like by a draft tongue 16. A power take-off drive shaft 18 conveys motive power from a tractor to the mower 10. A cutting header 20 is supported by the frame 12 and features a forwardly disposed cutterbar 30. The cutterbar 30 comprises a plurality of transversely spaced-apart disc cutter modules 32 driven for rotation about a generally vertical axis. Each disc cutter module 32 has a plurality of knives pivotally mounted on the periphery thereof to sever standing crop from the ground through an impact action. Such agricultural mowers are well-known in the art and configured for forward movement through a field of standing crop to sever the crop from the ground by interaction with the cutterbar. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein by reference.

Mowers are commonly pulled behind a tractor, such as the one shown in FIG. 1, or may be attached to and supported by a dedicated tractor in what is commonly referred to as a self-propelled mower. Pull-behind mowers may incorporate a pivoting draft tongue connection 17 to the frame 12 which allows the tongue 16 to pivot relative to the frame 12, as indicated in FIG. 1, thereby allowing the mower position behind the tractor to be altered. These are commonly referred to as center-pivot pull-behind mowers.

The cutting header 20 features a shroud 40 enclosing the cutterbar 30 in order to contain the severed crop material and any other airborne debris within the confines of the mower. Shroud 40 comprises side shields 42, a top shield 44 and a front curtain 46. The front curtain 46 is typically formed from a flexible material, such as rubber, which will deflect and allow standing crop to enter the cutterbar area. The top shield 44 traditionally a moveable portion, top cover 50, which is hinge-connected to the shroud 40 thereby enabling the the top cover 50 to be raised so that the cutterbar area may be accessed. Top cover 50 is shown in a lowered position in FIG. 1 as it would be positioned during mower operation. Top cover 50 may also comprise one or more individual cover sections 50a, 50b to maintain the individual cover weights reasonably low so that raising the covers may be easily performed by hand.

Figure 2:
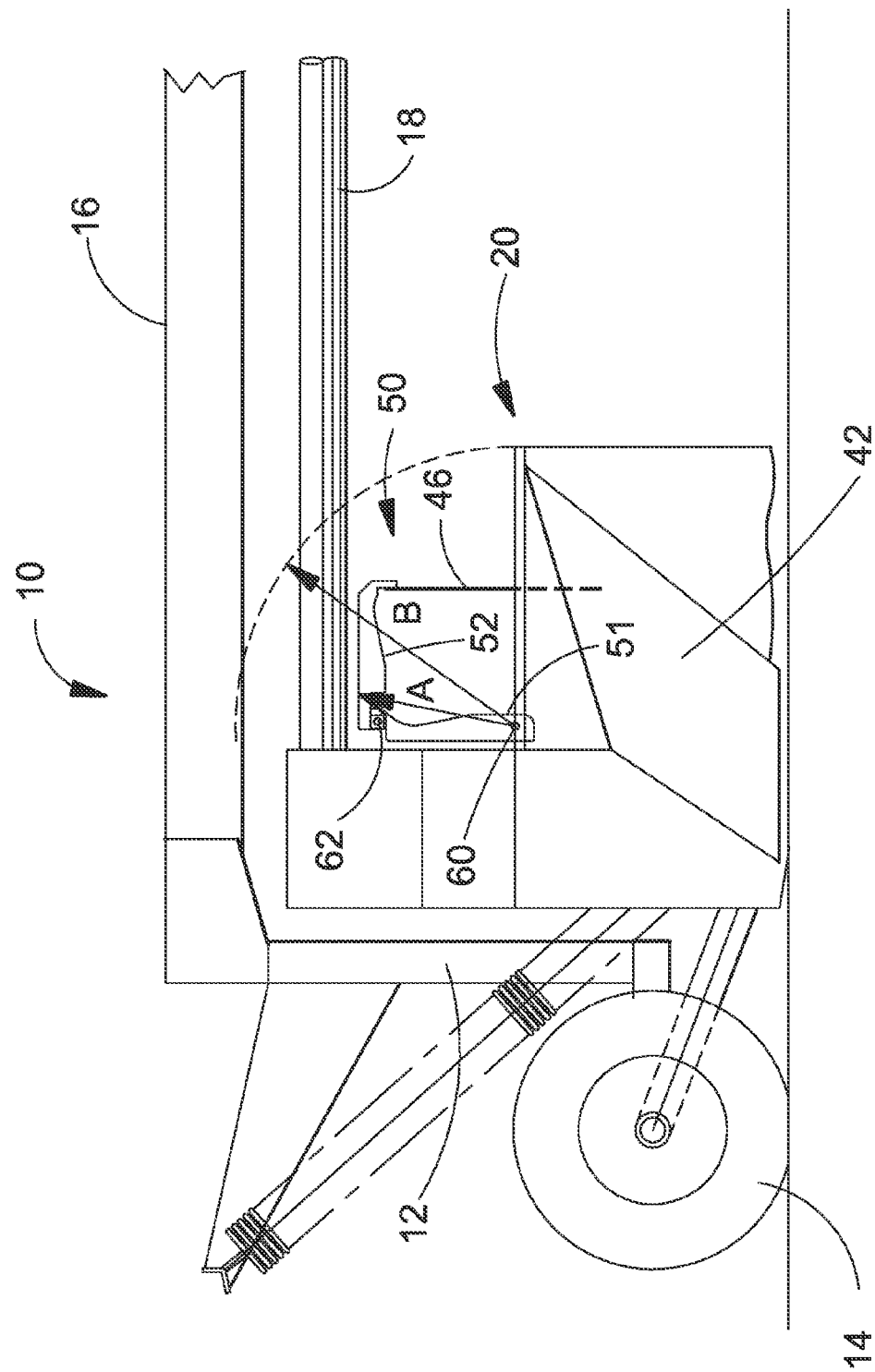
FIG. 2 is a side elevation view of the mower of FIG. 1 showing a first embodiment of the present invention wherein the top cover is shown in a raised position for service access to the mower.

Now referring to FIGS. 1 and 2, it can be seen that the vertical clearance between the shroud 40 and the draft tongue 16 or the drive shaft 18 is limited. On mowers having conventional top covers, opening the top cover (pivoting about hinge 60) would cause the forward edge of the top cover to swing through the arc shown having a radius "B." The present invention reduces the overhead clearance needed to open the top covers to the dimension shown as "A" by allowing the cover to fold as it is raised. This is especially useful on a center-pivot mower where the pivoting tongue may impact an inadvertently opened top cover and damage the cover.

Figure 3:
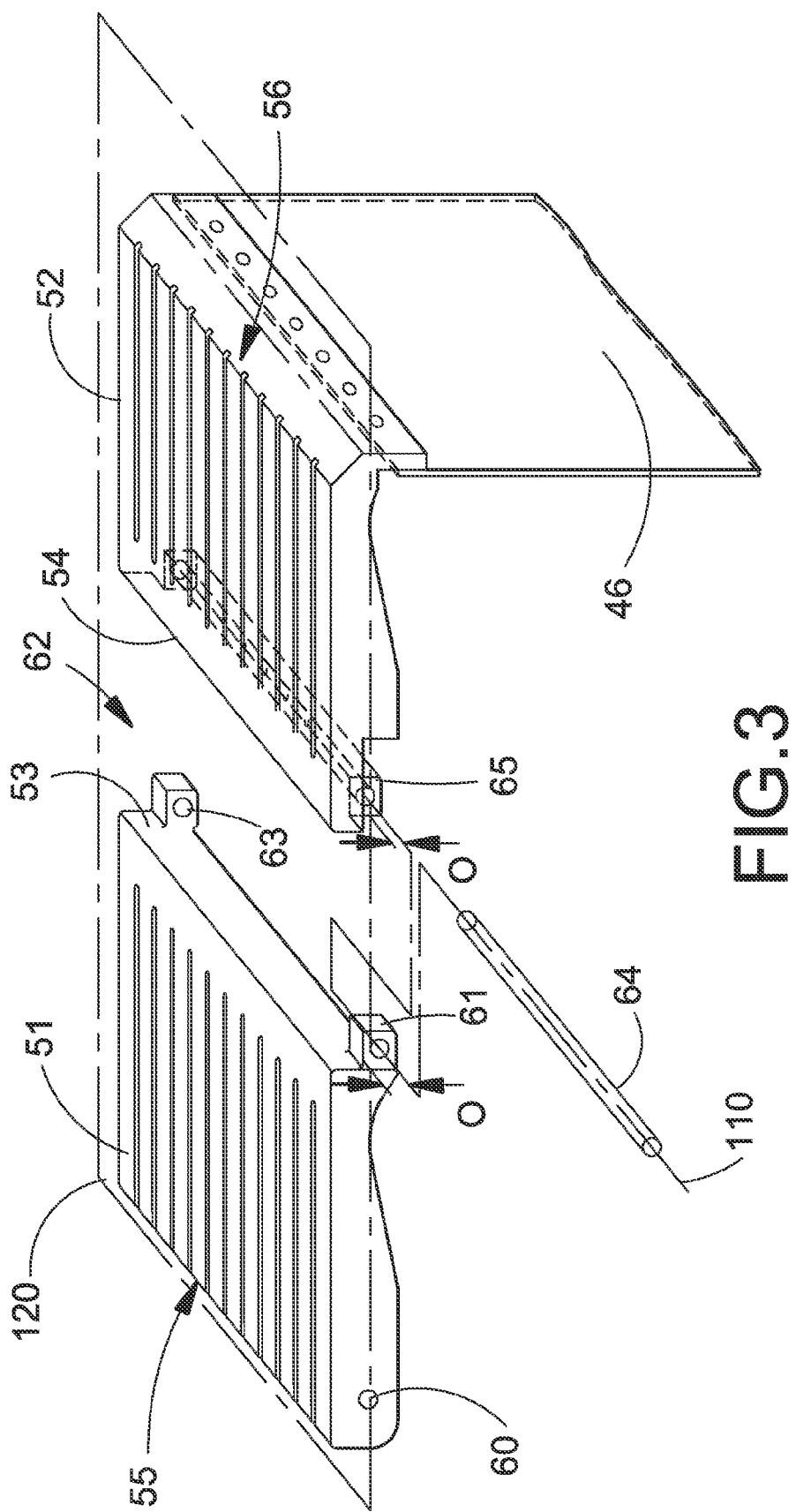
FIG. 3 is an exploded view of the top cover of the present invention.
Figure 4:
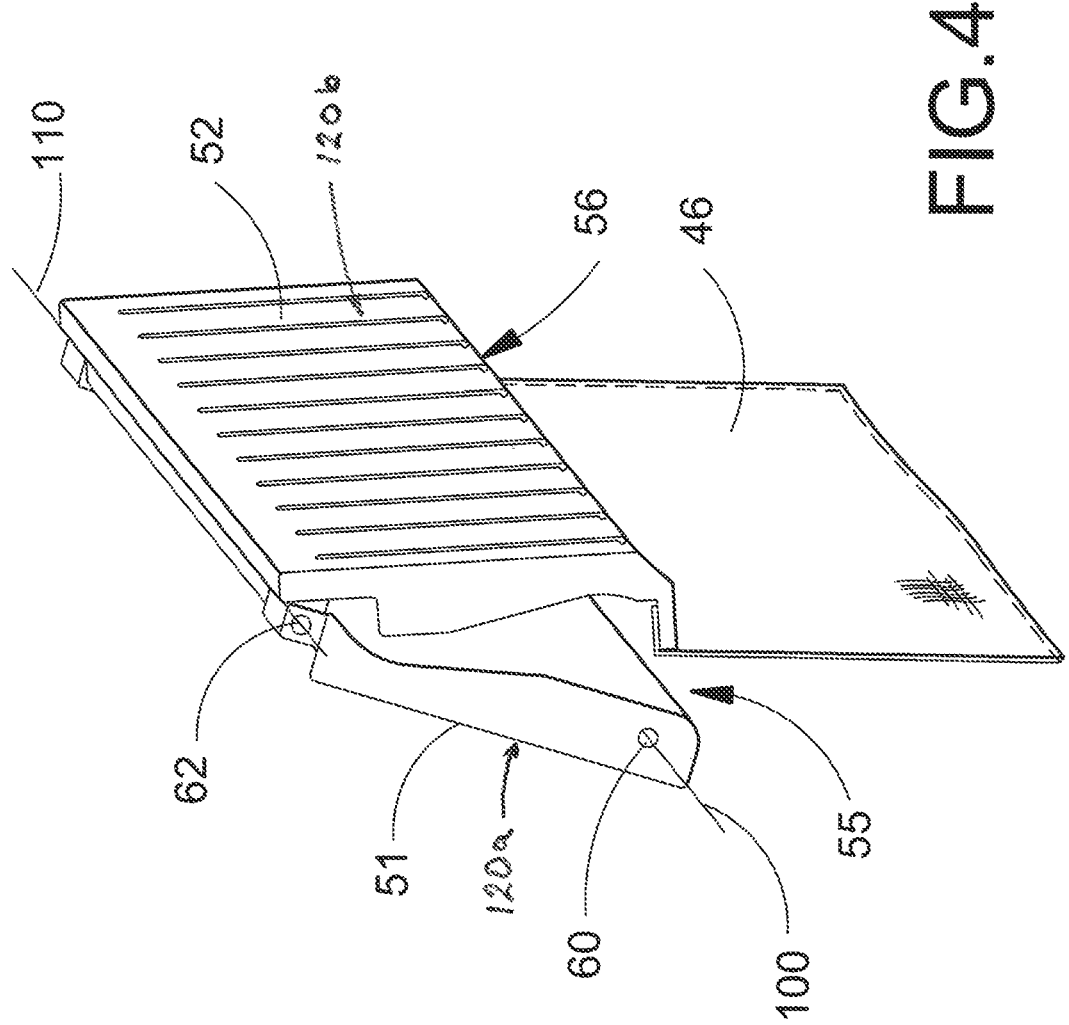
FIG. 4 is a perspective view of the top cover of FIG. 3 shown in a raised or folded position.

In FIG. 2, the moveable top cover 50 is shown in a raised position as it would be positioned to allow service access to the cutterbar 30. Referring to FIGS. 3 and 4, each top cover 50 comprises a first cover portion 51 and a second cover portion 52 that are hingedly connected to each other by folding hinge 62. First cover portion 51 is connected to the shroud 40 at its rearward edge in a hinged connection 60 along a hinge axis 100 and aligned on a generally transverse axis of the machine corresponding to a generally parallel alignment to the cutterbar 30. The front curtain 46 is connected to the forward edge of second cover portion 52, opposite to the folding hinge 62.

The width of the first and second cover portions 51, 52 measured perpendicularly to the transverse axis is generally equal thereby placing the folding hinge generally midway between the forward end 56 and the rearward end 55 of the top cover 50. Differing proportions of the first and second cover portion widths are permissible; however, a generally equal width proportion results in the minimum required overhead clearance to open the top cover and is therefore preferred.

First portion 51 includes a first stop surface 53 and second portions 52 includes a second stop surface 54 which interact to limit the degree of angular movement of the hinged connection between the first and second portions. Hinge tabs 61, 63, 65 on the first and second potions 51, 52 offset the hinge pin 64 generally downwardly from a reference planes 120a, 120b of the first and second portions (shown as offset "O" between reference plane 120 and pivot axis 110 in FIG. 3) of the first and second portions such that the stop surfaces will interact in adjacent contact when the first and second portions 51, 52 and their respective reference planes 120a, 120b are aligned co-planarly in reference plane 120. For convenience, reference planes 120a, 120b are defined as the top surface of the first and second portions. This does not require that the top surface of the portions be planar, but is used to establish a hinge offset dimension and direction. The offset hinge location and stop surfaces function as a hinge stop to limit the pivoting movement of the first and second portions 51, 52 in relation to each other so that the portions will support the top cover planar relationship when in the deployed or operating position and allow folding of the top cover only in the direction of the hinge pin 64 offset from the reference plane 120, generally upwardly as shown in FIG. 4.

When folded, as is illustrated in FIG. 4, the offset position of the hinge pin 64 enables the first and second portions to be folded into a more acute angular relation so to maximize the service opening when the top cover is moved to the raised position. Surface contouring of the first and second portions is also possible so that the adjacent surfaces of the portions will nest together and allow the first and second portions to be folded in to a more acute angular relationship.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A top cover for a shroud assembly on an agricultural mower, the mower having a frame supporting a transversely oriented cutterbar assembly, a frame-supported shroud partially surrounding the cutterbar assembly, and a draft tongue connected to the frame and disposed above the shroud, said top cover comprising:
   a first cover portion hingedly connected to the shroud along a first hinge axis, said first cover portion defining a first reference plane and including a first surface contoured bottom surface;
   a second cover portion hingedly connected to said first cover portion along a second hinge axis generally parallel to and spaced apart from said first hinge axis, said second cover portion defining a second reference plane and including a second surface contoured bottom surface, said second hinge axis being offset from said first and said second reference planes in an offset direction;
   a first stop surface on said first cover portion adjacent to said second hinge axis; and
   a second stop surface on said second cover portion adjacent to said second hinge axis,
   wherein said first stop surface and said second stop surface are positioned in adjacent contact to inhibit folding of said first cover portion and said second cover portion in a direction opposite of said offset direction and allow folding of said first cover portion and said second cover portion in said offset direction, and wherein in a folded position (i) the first surface contoured bottom surface of the first cover portion at least partially receives one or more portions of the second surface contoured bottom surface, and (ii) the second surface contoured bottom surface of the second cover portion at least partially receives one or more portions of the first surface contoured bottom surface.

2. The top cover of claim 1, wherein said first cover portion and said second cover portion are positioned generally coplanar when said first and said second stop surfaces are in adjacent contact.

3. The top cover of claim 2, wherein said first cover portion and said second cover portion each have a distal edge disposed opposite of said second hinge axis defining respective first and second cover portion widths therebetween and said first and second cover portion widths are generally equal.

4. The top cover of claim 1, wherein the first stop surface of the first cover portion includes two hinge tabs extending therefrom, a first portion of the second hinge axis passing through the two hinge tabs.

5. The top cover of claim 4, wherein the second stop surface of the second cover portion includes a hinge tab extending therefore, the second portion of the second hinge axis passing through the hinge tab.

6. The top cover of claim 5, wherein the hinge tab of the second cover portion fits between the two hinge tabs of the first cover portion to align the first portion of the second hinge axis and the second portion of the second hinge axis.

7. The top cover of claim 1, comprising a hinge pin passing through the second hinge axis.

8. The top cover of claim 1, wherein the first cover portion includes an edge defining a rearward end of the top cover, and wherein the second cover includes an edge defining a forward end of the top cover.

9. The top cover of claim 8, comprising a folding hinge disposed midway between the forward end and the rearward end of the top cover and hingedly connecting the second cover portion to the first cover portion.

10. The top cover of claim 1, wherein the first surface contoured bottom surface and the second surface contoured bottom surface include non-planar contouring.

11. The top cover of claim 1, wherein the first surface contoured bottom surface and the second surface contoured bottom surface are complementary in configuration.

12. The top cover of claim 1, wherein in the folded position, the first surface contoured bottom surface and the second surface contoured bottom surface at least partially nest together.

13. A top cover assembly for an agricultural mower comprising:
   a frame supporting a transversely oriented cutterbar assembly;
   a shroud supported by said frame and at least partially surrounding said cutterbar assembly;
   a draft tongue connected to the frame and disposed above said shroud by a clearance height;
   a first top cover portion hingedly connected to the shroud along a generally horizontal and transverse first hinge axis, said first cover portion defining a first reference plane and including a first surface contoured bottom surface;
   a second top cover portion hingedly connected to said first top cover portion along a second hinge axis generally parallel to and spaced apart from said first hinge axis, said second top cover portion defining a second reference plane and including a second surface contoured bottom surface, said second hinge axis being generally perpendicularly offset from said first and said second reference planes by an offset distance;
   a first stop surface on said first top cover portion adjacent to said second hinge axis; and
   a second stop surface on said second top cover portion adjacent to said second hinge axis,
   wherein said first stop surface and said second stop surface are positioned in adjacent contact to inhibit folding of said first cover portion and said second cover portion in a direction opposite of said offset direction and allow folding of said first cover portion and said second cover portion in said offset direction, and
   wherein in a folded position (i) the first surface contoured bottom surface of the first cover portion at least partially receives one or more portions of the second surface contoured bottom surface, and (ii) the second surface contoured bottom surface of the second cover portion at least partially receives one or more portions of the first surface contoured bottom surface.

14. The top cover assembly of claim 13, wherein said first top cover portion and said second top cover portion are positioned generally coplanar when said first and said second stop surfaces are in adjacent contact.

15. The top cover assembly of claim 14, wherein said first top cover portion and said second top cover portion each have a distal edge disposed opposite of said second hinge axis defining respective first and second top cover portion widths therebetween and said first and second top cover portion widths are generally equal.

16. The top cover assembly of claim 13, wherein said top cover assembly comprises one of more of said top cover assemblies.

17. The top cover assembly of claim 13, wherein the distance separating said first hinge axis and said second hinge axis enables said first top cover portion to be pivoted from a generally horizontal operation position to a generally vertical service position in a vertical space less than said clearance height.

18. The top cover assembly of claim 13, wherein the first surface contoured bottom surface and the second surface contoured bottom surface include non-planar contouring.

19. The top cover assembly of claim 13, wherein the first surface contoured bottom surface and the second surface contoured bottom surface are complementary in configuration.

20. The top cover assembly of claim 13, wherein in the folded position, the first surface contoured bottom surface and the second surface contoured bottom surface at least partially nest together.

* * * * *